United States Patent [19]

Bussell et al.

[11] 4,065,425

[45] Dec. 27, 1977

[54] PROCESS FOR THE PREPARATION OF NON-AQUEOUS DISPERSION COATINGS

[75] Inventors: George W. Bussell, Dearborn; Martin W. Kisel, Dearborn Heights, both of Mich.

[73] Assignee: Inmont Corporation, New York, N.Y.

[21] Appl. No.: 627,092

[22] Filed: Oct. 30, 1975

Related U.S. Application Data

[63] Continuation of Ser. No. 446,610, Feb. 28, 1974, abandoned.

[51] Int. Cl.$^2$ .......................... C08K 5/01; C08K 5/05; C08K 5/06; C08K 5/10
[52] U.S. Cl. .................. 260/33.6 EP; 260/31.4 EP; 260/31.4 R; 260/33.2 R; 260/33.4 EP; 260/33.4 R; 260/33.6 UA; 260/34.2
[58] Field of Search ............ 260/34.2, 33.6 UA, 33.2, 260/31.4 R, 31.4 EP, 33.4 EP, 33.6 EP, 33.4 R

[56] References Cited

U.S. PATENT DOCUMENTS

| | | | |
|---|---|---|---|
| 3,736,279 | 5/1973 | Camelon et al. | 260/34.2 |
| 3,745,137 | 7/1973 | Reid et al. | 260/33.6 UA |
| 3,812,075 | 5/1974 | Burdett et al. | 260/34.2 |
| 3,814,720 | 6/1974 | Maker et al. | 260/34.2 |
| 3,814,721 | 6/1974 | Maker et al. | 260/34.2 |
| 3,907,741 | 9/1975 | Maker et al. | 260/33.6 UA |
| 3,925,295 | 12/1975 | Osborn et al. | 260/34.2 |
| 3,926,899 | 12/1975 | Nordberg | 260/33.6 UA |
| 3,966,667 | 6/1976 | Sullivan et al. | 260/34.2 |

*Primary Examiner*—Allan Lieberman

[57] ABSTRACT

Pigmented non-aqueous dispersed polymer compositions containing melamine-formaldehyde resin are disclosed. The dispersed polymer and the soluble stabilizer polymer are both cross-linkable with the malamine resin to give improved thermosetting paints, especially for metal surfaces such as automobile bodies.

10 Claims, No Drawings

PROCESS FOR THE PREPARATION OF NON-AQUEOUS DISPERSION COATINGS

This is a continuation of application Ser. No. 446,610 filed Feb. 28, 1974 and now abandoned.

BACKGROUND OF THE INVENTION

This invention relates to thermosetting coating composition containing acrylic copolymers dispersed in a non-aqueous medium and to metal substrates coated therewith. The use of non-aqueous dispersions of acrylic polymers in coating compositions have received considerable attention in recent years as a means of applying film forming materials because such dispersions require the use of smaller amounts of volatile solvents, which results in less air pollution from the coating process, and also because it permits the application of fewer coats of the paint or finish to obtain adequate film thicknesses. The present invention relates primarily to non-aqueous acrylic polymer paints, or finishes, which are thermosetting. Such compositions as described in the prior art comprise pigmented non-aqueous dispersions wherein the dispersed acrylic polymer contains hydroxyl groups which are cross-linkably reactive with aminoplast resins, especially melamine formaldehyde resin. The dispersed polymer may also contain a small amount of free carboxyl groups along the polymer chain.

SUMMARY OF THE INVENTION

The present invention provides improved coating compositions, or paints, especially for metal substrates such as automobile bodies, by providing pigmented non-aqueous dispersions, containing aminoplast resin cross-linking agent, and a cross-linkable dispersed acrylic polymer, wherein the dispersed acrylic polymer is made in the presence of a solution of a preformed cross-linkable acrylic polymer. The preformed cross-linkable soluble polymer is comprised of preferably 40 to 70%, by weight of copolymerized solubilizing monomer such as lauryl methacrylate. Paints made in accordance with the invention have good storage stability in that they usually remain in suspension indefinitely even at spray viscosity and stay smooth and free of seed. In the infrequent instances when settling occurs, the sediment is soft and the paint is easily stirred to its original condition. When films of the paint are applied to metal substrates and the films are cured at a relatively low bake of 250° F. for 30 minutes, the thermoset coatings have good gloss, good adhesion, good acid spotting resistance, humidity resistance, excellent outdoor durability and hardness. The compositions have excellent application properties in that they have good build and antisag qualities even when blended with solution vehicles. The unexpectedly good resistance properties of the low-baked film makes the novel paints more useful as low-baked automotive repair finishes, i.e., finishes baked at 180° to 210° F. for 20 minutes using an acid catalyst. Such low-baked repair films prepared from paints of the present invention show unexpectedly good hardness, adhesion and resistance to humidity.

DESCRIPTION OF THE INVENTION

In accordance with the invention, a non-aqueous dispersion of a cross-linkable acrylic polymer is prepared by copolymerizing a mixture of suitable monoethylenically unsaturated monomers, including at least one hydroxyalkyl acrylic or methacrylic ester, or a glycidyl ester of acrylic or methacrylic acid. The copolymerization is carried out in the presence of a preformed solution of a cross-linkable stabilizer polymer comprised of at least 30% by weight of copolymerized solubilizing monomer such as lauryl methacrylate and a minor amount, especially 10 to 30%, of at least one monoethylenically unsaturated monomer containing a group which is cross-linkable with aminoplast resins. Suitable monomers containing cross-linkable groups include hydroxyethyl acrylate, hydroxyethyl methacrylate, hydroxypropyl acrylate, hydroxypropyl methacrylate, glycidyl acrylate and glycidyl methacrylate. Polymers containing such monomers are commonly referred to in the art as thermosetting acrylic polymers, or TSA polymers, The stabilizer polymer will usually contain minor amounts of other monoethylenically unsaturated monomers as hereinafter described.

The stabilizer polymers useful in the invention consist of 30 to 90% by weight, preferably 40 to 70% by weight of copolymerized solubilizing monomers, i.e., alkyl and cycloalkyl esters of acrylic and methacrylic acids wherein the alkyl or cycloalkyl group contains four or more carbon atoms; preferably at least about half of the solubilizing monomers is lauryl methacrylate. The stabilizer polymer also contains 10 to 30% by weight, preferably about 15 to 20% by weight of a monomer which contains a cross-linkable group and is of the group consisting of hydroxy propyl acrylate, hydroxy ethyl methacrylate, hydroxy propyl methacrylate, hydroxy ethyl acrylate and glycidyl methacrylate or acrylate, 0 to 40% by weight, preferably 15 to 20% by weight of styrene, or a derivative of styrene, especially an alkyl substituted styrene, such as vinyl toluene, and 0 to 3% by weight, preferably 0.5 to 1.5% by weight of acrylic acid, or similar α,β-unsaturated acid, such as methacrylic acid. This amount of acidic monomer is in addition to that in the hydroxyalkyl ester monomer, which usually is about 4% by weight of the hydroxyalkyl monomer. In compositions using glycidyl esters instead of hydroxyalkyl monomers, the preferred acid content would be zero or close to zero. Preferred solubilizing monomers include lauryl methacrylate, butyl and isobutyl acrylate, butyl and isobutyl methacrylate, 2-ethyl hexyl acrylate, 2-ethyl hexyl methacrylate, and isobornyl methacrylate.

The stabilizer is prepared in a solvent which is a solvent for the copolymer at 40 to 60% solids and the solvent is preferably aliphatic hydrocarbon or a mixture of aliphatic hydrocarbons with minor amounts of the glycol ethers, or the acetate esters of the glycol ethers (especially of the monoethyl ether), or aromatic hydrocarbons, or n-butanol, or several of these. The aliphatic hydrocarbon preferably should have a boiling point in the range of 130° to 140° C.

Copolymerization of the monomers to form the stabilizer polymer is carried out in conventional manner using free radical catalysts at temperatures on the order of 120° to 140° C., preferably close to 130° C., until substantially all of the monomer charge has been polymerized and the solids content is close to theoretical. Tertiary butyl perbenzoate is an especially preferred catalyst because it is a liquid and is readily miscible with the solvents used. Although it is unnecessary to heat the polymerization longer than is needed for complete conversion of monomer, it has been found that heating at reflux for extended periods of time, up to 4 hours, after the last catalyst addition is desirable in that it makes the stabilizer more effective even though the solids and viscosity of the product do not change appreciably.

The acid value of the stabilizer copolymer is generally in the range of 4 to 28, preferably 8 to 16, based on solids when hydroxyalkyl monomers are used. When glycidyl monomers are used, the acid value should be zero or close to zero.

The dispersion polymer composition is prepared by copolymerizing 50 to 90% by weight, preferably 65 to 75% by weight of the desired monomers in solution in the presence of 10 to 50% by weight, preferably 25 to 35% by weight of a dissolved stabilizer polymer as described above. The finished dispersion polymer composition contains 40 to 70% solids, by weight, and preferably 50 to 55% for best stability and working properties.

The dispersed polymer component consists of 30 to 80% by weight of a lower alkyl acrylate or methacrylate, preferably 45 to 55% by weight; 0 to 50% by weight, preferably 20 to 35% by weight, of styrene or vinyl toluene or similar monomers; 10 to 30% by weight, preferably 15 to 25% by weight, of a hydroxy lower alkyl acrylate or methacrylate, especially hydroxypropyl acrylate, hydroxyethyl acrylate, hydroxypropyl methacrylate and hydroxy ethyl methacrylate or a glycidyl ester, especially glycicyl acrylate and glycidyl methacrylate; 0 to 3% by weight, preferably 0.5 to 2% by weight, of acrylic or methacrylic acid. The amount of acid monomer refers to the amount in addition to that which is present in the hydroxyalkyl monomer, which usually is about 4% by weight of the hydroxyalkyl monomer. In compositions using glycidyl ester instead of hydroxyalkyl monomer the preferred acid content would be zero or close to zero. Lower alkyl as used herein means alkyl groups containing one to four carbon atoms. Ordinarily the use of more than a few percent of the higher acrylates cannot be tolerated because they tend to make the polymer too soluble.

Copolymerization of the desired dispersed polymer monomers in solution with the desired amount of stabilizer copolymer is carried out with conventional addition polymerization catalysts in the usual manner, e.g., at reflux temperature and with constant stirring. The acid value of the resulting dispersion polymer composition is usually on the order of 5 to 30 on a solids basis, preferably 10 to 20, when hydroxyalkyl esters are used; when glycidyl esters are used, the acid value should be zero or close to zero. The dispersion polymer composition consists of, on a solids basis 50 to 90% by weight dispersed polymer and 10 to 50% by weight of stabilizer polymer, but preferably about 65 to 75% by weight of dispersed polymer and 25 to 35% by weight of stabilizer polymer.

The dispersion polymer composition is formulated into a paint by dispersing the desired pigment in the composition and adding a solution of melamine formaldehyde as cross-linking agent for the stabilizer polymer and the dispersed polymer. Pigment content may range from about 1.5% to 25% by weight, on solids. Advantageously, the pigment is added as a dispersion in a solution of an acrylic resin which is preferably a solution of a thermosetting, i.e., cross-linkable, acrylic polymer in a high boiling solvent. The thermosetting acrylic polymer may be similar to the stabilizer copolymer or it may be any other suitable acrylic polymer, preferably a thermosetting acrylic polymer, that can serve as a pigment dispersion vehicle for the pigment.

In general, the finished paint contains melamine resin, dispersed TSA polymer, and soluble TSA polymer as binder components. The soluble TSA polymer comprises the cross-linkable acrylic polymer used as stabilizer and any other soluble cross-linkable acrylic such as that included as part of the pigment dispersion. The ratios of these three components, on a weight basis, will usually be 25 to 35% melamine resin, 10 to 50% dispersed polymer and 20 to 55% soluble acrylic polymer. The total solids of the paint at spray viscosity normally will be about 40 to 50%, including pigment. The binder resin to pigment ratio in the finished paint will be from about 50 to 1 to about 3 to 1, on a weight basis.

In the present application the term "dispersion polymer composition" is used to mean the composition which is prepared by copolymerizing acrylic monomers, to obtain insoluble polymers, in the presence of a dissolved acrylic polymer which acts as a stabilizer to keep the insoluble dispersed polymer in dispersed form. Such a dispersion polymer composition is sometimes referred in the art as "non-aqueous dispersion," or is abbreviated as N A D. Such dispersions are also sometimes referred to as "organosols."

Paints formulated in accordance with the invention, using the non-aqeuous dispersion polymer compositions described above and in the examples, will contain volatile organic solvents consisting predominantly of aliphatic hydrocarbons, pigment, and thermosetting film-forming binder consisting of a mixture of 25 to 35% by weight of dissolved butylated melamineformaldehyde resin and 65 to 75% by weight of thermosetting, cross-linkable acrylic polymers. One-fourth to three-fourths of the thermosetting acrylic polymer is insoluble in the vehicle and is stably dispersed in the vehicle.

The following examples in which the parts are by weight will further illustrate the invention.

EXAMPLE 1

A mixture of

| | |
|---|---|
| Lauryl methacrylate | 625 parts |
| Styrene | 150 parts |
| Hydroxypropyl methacrylate | 200 parts |
| Acrylic acid | 15 parts |
| Aliphatic hydrocarbon, B. P. about 130° C. (e.g. Espesol 260 F.) | 100 parts |
| Tert. Butyl perbenzoate | 15 parts | was added to a refluxing and constantly stirred mixture of

| | |
|---|---|
| Aliphatic hydrocarbon (as above) | 500 parts |
| Cellosolve | 100 parts |
| Butyl cellosolve | 100 parts | at a constant rate over a period of 3½ hours. Refluxing was continued for ½ hour and then a mixture of

| | |
|---|---|
| Aliphatic hydrocarbon (as above) | 50 parts |
| Tert. Butyl perbenzoate | 5 parts | was added over a 15 minute period and then refluxing was continued for another 2 hours. The reaction mixture was reduced with 120 parts of aliphatic hydrocarbon (as above) to give a stabilizer polymer solution having a Gardner-Holt viscosity of P - Q, a non-volatile content of 49% and an acid value of 16.1 based on non-volatile. The polymer solution is used as a stabilizer for preparing dispersion polymer compositions.

A dispersion polymer composition was made by adding a mixture of

| Methyl methacrylate | 274 parts |
|---|---|
| Styrene | 172 parts |
| Hydroxypropyl methacrylate | 115 parts |
| Acrylic acid | 13 parts |
| Aliphatic hydrocarbon (as above) | 116 parts |
| Tert. Butyl perbenzoate | 16 parts | to a refluxing and constantly stirred mixture of

| Stabilizer polymer solution (as above) | 500 parts |
|---|---|
| Aliphatic hydrocarbon (as above) | 164 parts | over a period of 3½ hours at a constant rate of addition. Refluxing was continued for 30 minutes and then a mixture of

| Aliphatic hydrocarbon (as above) | 50 parts |
|---|---|
| Tert. Butyl perbenzoate | 10 parts | was added at a uniform rate over 30 minutes. Refluxing and strong agitation were continued another 2 hours and then a mixture of

| Aliphatic hydrocarbon (as above) | 50 parts |
|---|---|
| n-Butanol | 85 parts |
| Butyl Cellosolve | 55 parts | was added at a uniform rate over 15 minutes and then the batch was cooled to room temperature to give a finished dispersion composition having a viscosity of 66 seconds (No. 4 Ford Cup) at 74° F., a non-volatile content of 51.1% and an acid value of 20.3 based on non-volatiles. The dispersion polymer composition consists of 30% dissolved polymer (stabilizer) and 70% dispersed polymer on a non-volatile basis. The overall composition of the non-volatile is

| Methyl methacrylate | 33.5% |
|---|---|
| Lauryl methacrylate | 18.8% |
| Styrene | 25.5% |
| Hydroxy propyl methacrylate | 20.2% |
| Acrylic acid | 2.0% |

A paint was prepared by mixing

| Dispersion polymer composition, at 51% non-volatiles | 220 parts |
|---|---|
| Pigment dispersion (10.0% aluminum powder and 5.5% quinacridone magenta pigment dispersed in 22.8% soluble thermosetting acrylic polymer, 21.1% butyl cellosolve acetate, 15.4% aromatic naphtha, 9.2% xylene, 5.4% mineral spirits, 1.4% isopropanol, and 9.2% n-Butanol) | 45 parts |
| Melamine Resin Solution (61% butylated melamine formaldehyde resin in a mixture of n-Butanol and aliphatic hydrocarbon) | 87 parts |
| Espesol 260 F. (aliphatic hydrocarbon, B.P. about 130° C.) | 85 parts |
| Butyl ether of ethylene glycol | 10 parts |
| 2 - Ethyl hexyl alcohol | 10 parts |

The paint had a viscosity of 17 seconds 77° F. (Ford No. 4 Cup) and was suitable for application by spraying. It had a solids content of 39.9% (calculated) and a pigment to binder ratio of 4/100. The paint showed no settling and was free of seeds, i.e., it was smooth and stable and did not become seedy on further reduction with solvents. A panel sprayed with the paint was baked 30 minutes at 250° F. and had a 20° gloss at 75 at 1.7 mils film thickness.

The soluble thermosetting acrylic polymer used in the pigment dispersion was a copolymer of 24% lauryl methacrylate, 24% 2-ethyl hexyl methacrylate, 20% hydroxyethyl methacrylate, 30.5% styrene and 1.5% methacrylic acid.

EXAMPLE 2

Using a procedure similar to that of Example 1, a 50% stabilizer polymer solution in a mixture of 4 parts Espesol 260° F, 0.5 part cellosolve and 0.5 part butyl cellosolve was prepared from a mixture of

| Lauryl methacrylate | 32 parts |
|---|---|
| Isobornyl methacrylate | 31.5 parts |
| Styrene | 15.0 parts |
| Hydroxypropyl methacrylate | 20.0 parts |
| Acrylic acid | 1.5 parts |

This stabilizer solution was substituted for that used in Example 1 to obtain non-aqueous dispersion polymer composition having a viscostiy of 40 seconds (No. 4 Ford Cup) at 77° F., a non-volatile content of 51% and an acid value of 19 based on non-volatiles. The paint prepared from the non-aqueous polymer composition had desirable properties similar to those of the paint of Example 1.

EXAMPLE 3

A mixture of

| Lauryl methacrylate | 678 parts |
|---|---|
| Styrene | 150 parts |
| Hydroxypropyl methacrylate | 150 parts |
| Acrylic acid | 12 parts |
| Aliphatic hydrocarbon (as in Example 1) | 100 parts |
| Tertiary butyl perbenzoate | 15 parts | was added at a constant rate over a period of 3½ hours to a refluxing and agitated mixture of

| Aliphatic hydrocarbon (as above) | 500 parts |
|---|---|
| Cellosolve | 100 parts |
| Butyl cellosolve | 100 parts |

Refluxing was continued for ½ hour after the addition was completed and then a mixture of

| Aliphatic hydrocarbon (as above) | 50 parts |
|---|---|
| Tertiary butyl perbenzoate | 5 parts | was added over a 15 minute period and then reflux and agitation were continued for two hours. The finished resin solution had a viscosity of K (Gardner Holt) at 52.7% solids and an acid value of 12.6 based on non-volatiles. The polymer solution was used as stabilizer for preparing dispersion polymer compositions.

A dispersion polymer composition was made by adding a monomer mixture of

| Methyl methacrylate | 342 parts |
|---|---|
| Styrene | 190 parts |

| | |
|---|---|
| Hydroxypropyl methacrylate | 95 parts |
| Acrylic acid | 5 parts |
| Aliphatic hydrocarbon (as above) | 50 parts |
| Tertiary butyl perbenzoate | 18 parts | to a refluxing and strongly agitated mixture of

| | |
|---|---|
| Stabilizer polymer solution (as above) | 400 parts |
| Aliphatic hydrocarbon (as above) | 300 parts | over a period of 3½ hours. Refluxing and agitation were continued for 30 minutes and then a mixture of

| | |
|---|---|
| Aliphatic hydrocarbon (as above) | 49 parts |
| Tertiary butyl perbenzoate | 11 parts | was added over a period of 15 minutes. Two hours after this addition was complete the reaction mixture was reduced with

| | |
|---|---|
| Aliphatic hydrocarbon (as above) | 100 parts |
| n-Butanol | 85 parts |
| Monobutyl ether of ethylene glycol | 55 parts | over a period of 15 minutes. The batch was then cooled to 50° C. and poured through a fine strainer. Strong agitation was maintained from the start of the addition of the monomer mixture until the time of pouring. Reflux was maintained continuously until the reduction with solvent. The resulting dispersion polymer composition was smooth and non-settling. The dispersion polymer composition is useful as a non-aqueous dispersion in the formulation of a paint similar to that in Example 1.

EXAMPLE 4

A dispersion polymer composition was made by the procedure of Example 3, except that 3 hours instead of 3½ hours were used to add a monomer mixture consisting of

| | |
|---|---|
| Methyl methacrylate | 320 parts |
| Styrene | 180 parts |
| Hydroxyethyl acrylate | 95 parts |
| Methacrylic acid | 5 parts |
| Aliphatic hydrocarbon (as in Example 1) | 83 parts |
| Tertiary butyl perbenzoate | 17 parts | to a stabilizer polymer solution consisting of

| | |
|---|---|
| Stabilizer polymer solution of Example 3) | 380 parts |
| Aliphatic hydrocarbon (as above) | 270 parts | and adding further catalyst mixture consisting of

| | |
|---|---|
| Aliphatic hydrocarbon (as above) | 50 parts |
| Tertiary butyl perbenzoate | 10 parts | and reducing with

| | |
|---|---|
| Aliphatic hydrocarbon (as above) | 70 parts |
| n-Butanol | 60 parts |
| Monobutyl ether of ethylene glycol | 60 parts |

The resulting dispersion polymer composition was smooth and non-settling, had a viscosity of 42 seconds (#4 Ford Cup) at 74° F. and 51.4% solids. The resin had an acid number of 10.3 based on solids. The stabilizer polymer component was 25% by weight of the total solids. The dispersion was used to formulate a paint as in Example 1 consisting of

| | |
|---|---|
| Dispersion polymer composition | 43 parts |
| Thermosetting acrylic resin solution (50% solids solution of a copolymer of 48% butyl methacrylate, 35% styrene, 15% hydroxyethyl methacrylate and 2% methacrylic acid in a mixture of 60 parts n-butyl acetate and 40 parts cellosolve acetate) | 47 parts |
| Melamine resin solution (60% solids butylated melamine-formaldehyde in a mixture of 87 parts n-butanol and 13 parts aliphatic naphtha) | 37 parts |
| Titanium dioide paste (59.9% pigment, 14.6% soluble thermosetting acrylic resin and 25.5% solvent consisting of 67.8 parts xylene, 19.7 parts high flash aromatic naphtha, 7.6 parts n-butanol, and 4.9 parts cellosolve acetate) | 34 parts |
| Phthalocyanine blue paste (7.6% pigment, 33.9% soluble thermosetting acrylic resin and 58.5% solvent consisting of a mixture of 73.4 parts xylene, 18.8 parts cellosolve acetate and 7.8 parts aromatic naphtha) | 4 parts |
| Ethyl acetate (88%) | 42 parts |
| Cellosolve acetate | 26 parts |
| Toluene | 11 parts |
| Aromatic naphtha | 6 parts |
| Total | 250 parts |

The paint solids consist of 22% pigment and 78% binder and at spray viscosity of 15.5 seconds at 74° F. (#4 Ford Cup) the paint has a solids content of 37.9%. The binder component of the paint consists of 22.5% dispersed polymer, 30% melamine resin and 47.5% soluble thermosetting acrylic resin. When sprayed out and baked 30 minutes at 250° F., the baked film had a 20° gloss of 81 at 2.3 mils thickness.

The thermosetting acrylic resin used in the titanium dioxide paste was a copolymer of 48% butyl methacrylate, 30.5% styrene, 20% hydroxy ethyl methacrylate and 1.5% methacrylic acid.

The thermosetting acrylic resin used in the phthalocyanine blue paste was a copolymer of 31.5% styrene, 31% hydroxypropyl methacrylate, 21% butyl acrylate, and 16.5% methyl methacrylate.

EXAMPLE 5

A dispersion polymer composition was made by the procedure of Example 4 by adding a monomer mixture containing

| | |
|---|---|
| Methyl methacrylate | 300 parts |
| Styrene | 160 parts |
| Hydroxyethyl methacrylate | 95 parts |
| Acrylic acid | 5 parts |
| Aliphatic hydrocarbon (as in Example 1) | 94 parts |
| Tertiary butyl perbenzoate | 16 parts | to a stabilizer polymer solution consisting of

| | |
|---|---|
| Stabilizer polymer solution of Example 3 | 455 parts |
| Aliphatic hydrocarbon (as above) | 245 parts | and adding further catalyst mixture consisting of

| | |
|---|---|
| Aliphatic hydrocarbon (as above) | 50 parts |
| Tertiary butyl perbenzoate | 10 parts | and reducing with

| | |
|---|---|
| Aliphatic hydrocarbon (as above) | 50 parts |
| n-Butanol | 60 parts |
| Monobutyl ether of ethylene glycol | 60 parts |

The resulting dispersion polymer composition was smooth and non-settling and had other properties similar to the dispersion polymer compositions of Examples 3 and 4. It contains 30% stabilizer polymer, based on total solids, while the dispersion polymer compositions of Examples 3 and 4 both contain 25% stabilizer polymer, on a solids basis.

EXAMPLE 6

A stabilizer polymer solution was prepared by the procedure of Example 3 by adding a mixture of

| | |
|---|---|
| Lauryl methacrylate | 395 parts |
| 2 - Ethyl hexyl methacrylate | 390 parts |
| Hydroxypropyl methacrylate | 200 parts |
| Acrylic acid | 15 parts |
| Aliphatic hydrocarbon (as in Example 1) | 100 parts |
| Tertiary butyl perbenzoate | 15 parts | to a refluxing and agitated mixture of

| | |
|---|---|
| Aliphatic hydrocarbon (as above) | 500 parts |
| Monoethyl ether of ethylene glycol | 100 parts |
| Monobutyl ether of ethylene glycol | 100 parts |

The addition was made at a constant rate over a period of 3½ hours. Refluxing and agitation were continued for 30 minutes after the monomer addition was completed and then a mixture of

| | |
|---|---|
| Aliphatic hydrocarbon (as above) | 50 parts |
| Tertiary butyl perbenzoate | 5 parts | was added over a 15 minute period and then refluxing and agitation were continued for 2 hours. Finally the batch was reduced to viscosity F at 47.5% solids with 130 parts of Espesol 260° F. (aliphatic hydrocarbon B.P. about 130° C.). The stabilizer polymer solution had an acid value of 16.4 based on solids.

A dispersion polymer composition was prepared by adding a monomer solution containing

| | |
|---|---|
| Methyl methacrylate | 274 parts |
| Styrene | 172 parts |
| Hydroxypropyl methacrylate | 115 parts |
| Acrylic Acid | 13 parts |
| Espesol 260F | 100 parts |
| Tertiary butyl perbenzoate | 16 parts | to a refluxing and strongly agitated mixture of

| | |
|---|---|
| Stabilizer polymer solution 47.5% solids | 500 parts |
| Espesol 260F | 200 parts |

The addition was made at a constant rate over a period of 3½ hours and gentle refluxing was continued for 30 minutes after the addition was completed and then additional catalyst solution consisting of

| | |
|---|---|
| Tertiary butyl perbenzoate | 10 parts |
| Espesol 260 F | 50 parts | was added over a period of 30 minutes and refluxing and agitation were continued for 2 hours. Finally the batch was reduced with

| | |
|---|---|
| Espesol 260 F | 50 parts |
| n-Butanol | 85 parts |
| Butyl cellosolve | 55 parts | to a solids content of 52% and viscosity of 65 seconds (#4 Ford Cup) at 73° F. The dispersion had an acid number of 18.6 based on solids and showed no settling after 3 days storage. The dispersion was used to prepare a paint consisting of

| | |
|---|---|
| Dispersion polymer composition 52% solids | 200 parts |
| Pigment dispersion | 40 parts |
| Melamine resin | 78 parts |
| Solvents | 92 parts |

The paint had a spray viscosity of 18 seconds (#4 Ford Cup) at 73° F., a non-volatile content of 39.5% (38% resin + 1.5% pigment), a pigment/binder ratio of 3.9/100 and baked films of the paint, baked 30 minutes at 250° F., had a 20° gloss of 67 at 2.0 mils thickness.

The binder resin component in the above paint consists of 46% dispersed resin (from the dispersion polymer composition), 29.4% melamine resin and 24.6% soluble thermosetting acrylic resin (including the stabilizer polymer and the pigment dispersion resin). The pigment consists of 65% aluminum pigment and 35% Quinacridone Magenta Toner. The solvents consist of 61.6% aliphatic naphthas (Espesol 260° F and Soltrol 50), 21.5% alcohols (n-butanol, 2-ethyl hexanol, isopropanol), 9.3% monobutyl and monoethyl ethers of ethylene glycol, 4.1% Xylene and aromatic naphtha and 3.5% monobutyl ether of ethylene glycol acetate. The pigment dispersion resin is the same as that described in Example 1 - pigment dispersion.

EXAMPLE 7

In a manner similar to Example 3, a stabilizer polymer solution at 48.7% solids was made from

| | |
|---|---|
| Lauryl methacrylate | 440 parts |
| 2 - Ethyl-hexyl methacrylate | 200 parts |
| Styrene | 150 parts |
| Hydroxypropyl methacrylate | 200 parts |
| Acrylic acid | 10 parts |
| Espesol 260F | 185 parts |
| Cellosolve | 100 parts |
| Butyl cellosolve | 100 parts |

The 48.7% solids solution had viscosity of 0 at 25° C. and an acid number of 12.3 based on solids.

A dispersed polymer was formed in a solution of the stabilizer in a manner similar to Example 3 from a solution of a mixture of monomers and catalyst consisting of

| | |
|---|---|
| Methyl methacrylate | 316 parts |
| Styrene | 176 parts |

| | |
|---|---|
| Hydroxypropyl methacrylate | 88 parts |
| Acrylic acid | 5 parts |
| Espesol 260F | 98 parts |
| Tertiary butyl perbenzoate | 17 parts | a stabilizer polymer solution consisting of

| | |
|---|---|
| Stabilizer polymer solution from above (48.7% solids) | 500 parts |
| Espesol 260F | 200 parts | an additional catalyst solution consisting of

| | |
|---|---|
| Espersol 260F | 50 parts |
| Tertiary butyl perbenzoate | 10 parts | and a reducing solvent mixture of

| | |
|---|---|
| Espersol 260F | 70 parts |
| n-Butanol | 85 parts |
| Monobutyl ether of ethylene glycol | 55 parts |

This dispersion polymer composition had a viscosity of 61 seconds at 71° F. (#4 Ford Cup), 50.5% solids, and an acid number of 12.1 based on solids. The dispersion was smooth, non-settling and useful for preparing paints in accordance with the invention.

EXAMPLE 8

Using the stabilizer polymer solution of Example 7, a dispersion polymer composition was formed in a manner similar to Example 4 from a solution of a mixture of monomers and catalyst consisting of

| | |
|---|---|
| Methyl methacrylate | 317 parts |
| Vinyl toluene | 146 parts |
| Hydroxypropyl methacrylate | 117 parts |
| Acrylic acid | 5 parts |
| Espesol 260F | 59 parts |
| Tertiary butyl perbenzoate | 16 parts | a stabilizer polymer solution consisting of

| | |
|---|---|
| Stabilizer polymer solution of Example 7 | 500 parts |
| Espesol 260F | 250 parts | an additional catalyst solution consisting of

| | |
|---|---|
| Espesol 260F | 50 parts |
| Tertiary butyl perbenzoate | 10 parts | and a reducing solvent mixture of

| | |
|---|---|
| Espesol 260F | 60 parts |
| n-Butanol | 60 parts |
| Monobutyl ether of ethylene glycol | 60 parts |

This dispersion polymer composition was smooth and non-settling, had a non-volatile content of 51.6%, and acid number of 11.2 based on solids, and a #4 Ford Cup viscosity of 55 seconds at 72° F. It was used to prepare a sprayable paint of the following composition.

| | |
|---|---|
| Dispersion polymer composition (at 51.6% N.V.) | 84 parts |
| Thermosetting acrylic resin solution (at 50% N.V.) as in Example 4 | 43 parts |
| Melamine resin solution (at 60% N.V.) | 70 parts |
| Black pigment paste (3.7% pigment, 30.6% binder resin) | 67 parts |
| Reducing solvents | 130 parts |

The binder in the black pigment paste is a soluble thermosetting acrylic resin similar to that used in the blue paste of Example 4, and the pigment to total binder ratio in the paint is 1/51. The binder consists of about 24% dispersed polymer, 43% soluble thermosetting acrylic polymer (including stabilizer polymer and binder in the pigment paste), and 33% melamine resin. The overall solvent composition is about 51% esters (ethyl acetate, cellosolve acetate, butyl cellosolve acetate and butyl acetate), 22% aromatic hydrocarbon (xylene, toluene and aromatic naphtha), 14% aliphatic naphthas, 11% butanol, and 2% cellosolve and butyl cellosolve. The paint at 33% solids (0.64% pigment, 32.36% binder resin) had a spray viscosity of 15½ seconds at 74° F. (#4 Ford Cup). A spray out of the paint on a primed steel panel and baked 30 minutes at 250° F. had a 20° gloss of 80 at 1.9 mils thickness. The baked film had good mar resistance, humidity resistance and acid spotting resistance.

EXAMPLE 9

A stabilizer polymer solution was prepared by adding a solution of monomers and catalyst consisting of

| | |
|---|---|
| Lauryl methacrylate | 460 parts |
| Butyl methacrylate | 230 parts |
| Styrene | 150 parts |
| Hydroxypropyl methacrylate | 150 parts |
| Acrylic acid | 10 parts |
| Espesol 260F | 40 parts |
| Tertiary butyl perbenzoate | 8 parts | to 600 parts of refluxing and agitated Espesol 260 over a period of two hours. Immediately upon completion of the addition of the monomer and catalyst solution an additional catalyst solution, consisting of 7 parts tertiary butyl perbenzoate and 145 parts of Espesol 260F, was added to the reaction mixture over a period of 2 hours and heating and refluxing were continued for 3 hours. The mixture was then reduced with 200 parts Espesol 260F and cooled. The resin solution had a solids content of 49.3%, an acid number of 9.8 based on solids, and a Gardner Holt viscosity of z3 – z4 at 25° C.

Three different dispersion polymer compositions were prepared using the above stabilizer polymer as follows:

| | Dispersions (Parts) | | |
|---|---|---|---|
| Part A | #1 | #2 | #3 |
| Stabilizer polymer solution, at 49.3% solids | 500 | 500 | 400 |
| Espesol 260F | 200 | 200 | 300 |
| Part B | | | |
| Methyl methacrylate | 137 | 137 | 219 |
| n-Butyl methacrylate | 137 | — | — |
| n-Butyl acrylate | — | 137 | — |
| Styrene | 172 | 172 | 137 |
| Hydroxypropyl methacrylate | 115 | 115 | 92 |
| Acrylic acid | 10 | 10 | 8 |
| Espesol 260F | 113 | 113 | 221 |
| t-Butyl perbenzoate | 16 | 16 | 13 |

-continued

| Part A | Dispersions (Parts) | | |
|---|---|---|---|
|  | #1 | #2 | #3 |
| Part C |  |  |  |
| Espesol 260F | 50 | 50 | 50 |
| t-Butyl perbenzoate | 10 | 10 | 10 |
| Part D |  |  |  |
| Espesol 260F | 340 | 220 | 190 |
| n-Butanol | 50 | 60 | — |
| Butyl cellosolve | 50 | 60 | — |

The same cooking procedure was used for each of the three dispersions and consisted of adding Part B to the strongly agitated and refluxing Part A over a period of three hours, refluxing for an additional ½ hour, adding Part C over a period of 15 minutes, refluxing and agitating for 2 hours, adding Part D over a period of 15 minutes, and cooling.

Dispersion 1 had a No. 4 Ford Cup viscosity of 58 seconds at 77° F., a solids content of 46.3%, and an acid number of 13.5 based on solids. The dispersion was used to formulate two light blue paints similar to that of Example 4 at 15% and 25.5% pigment. The paints gave good results similar to those of Example 4 with baked films having a gloss of over 80. The paints have good stability in that they showed substantially no settling at spray viscosity.

Dispersion 2 had a viscosity of 315 seconds (No. 4 Ford Cup) at 80° F., a solids content of 47.7% and an acid number of 14.1 based on solids. A light blue paint similar to that of Example 4 was made from the dispersion wherein the solids content of the paint consisted of 19% pigment and 81% binder resin, the binder in this case consisting of 28% dispersed thermosetting acrylic resin, 30% melamine resin and 42% soluble thermosetting acrylic resins. At 37.2% solids, the paint had a viscosity of 15½ seconds (No. 4 Ford Cup) at 74° F., and a spray out baked 30 minutes at 250° F. had a 20° gloss of 72 at 2.2 mils film thickness. The baked film had satisfactory hardness and gloss for use as a topcoat automobile finish.

Dispersion 3, at 40.7% solids, was too thixotropic for viscosity determination by Ford Cup but it was fairly fluid when stirred and had satisfactory working properties. The acid number was 14.1 based on solids. A paint was fomulated consisting of:

| Dispersion 3, at 40.7 N.V. | 54 parts |
|---|---|
| Soluble thermosetting acrylic resin solution (50% N.V.) same as in Example 4 | 47 parts |
| Melamine resin solution (Same as in Example 4) | 37 parts |
| Titanium dioxide paste (Same as in Example 4) | 34 parts |
| Phthalocyamine blue paste (Same as in Example 4) | 4 parts |
| Ethyl acetate | 37 parts |
| Cellosolve acetate | 23 parts |
| Toluene | 10 parts |
| Aromatic naphtha | 5 parts |

This paint at 37.8% solids (22% pigment, 78% binder) had a viscosity of 15½ seconds (No. 4 Ford Cup) at 74° F. A sprayed film on primed steel was baked 30 minutes at 250° F. and had a 20° gloss of 72 at 1.9 mils film thickness. The solvents in the paint consist of 32.6% alkyl esters (ethyl acetate and butyl acetate), 21.3% of the acetate esters of cellosolve and butyl cellosolve, 21.7% aliphatic naphthas (Espesol 260F and Soltrol 50), 15.7% aromatic hydrocarbons and 8.7% n-butanol.

EXAMPLE 10

A stabilizer polymer solution was prepared by adding Mixture B over a period of 3.5 hours to agitated and refluxing (132° C.) Mixture A and refluxing was continued for 0.5 hour. Then Mixture C was rapidly added and refluxing continued for two hours. Finally 120 parts of Espesol 260F was added and the batch was cooled.

| Mixture A |  |
|---|---|
| Espesol 260F | 300 parts |
| Butyl cellosolve | 250 parts |
| Cellosolve | 125 parts |
| Mixture B |  |
| Lauryl methacrylate | 389 parts |
| Styrene | 389 parts |
| Hydroxypropyl methacrylate | 198 parts |
| Acrylic acid | 14 parts |
| Espesol 260F | 100 parts |
| t-Butyl perbenzoate | 25 parts |
| Cellosolve | 15 parts |
| Mixture C |  |
| Espesol 260F | 50 parts |
| t-Butyl perbenzoate | 5 parts |

The resulting resin solution had a viscosity of T+ (Gardner-Holt) at 25° C., a solids content of 52% and an acid number of 14.5 based on solids.

The stabilizer polymer solution prepared above was used to prepare a dispersion polymer composition by adding Mixture B (below) over a 3.5 hour period to refluxing (128° C.) Mixture A (below), refluxing an additional 30 minutes before adding Mixture C over a period of 30 minutes and then refluxing another 2 hours. Finally, the batch was reduced with Mixture D and the reaction mixture was cooled. Strong agitation was used throughout the cook.

| Mixture A |  |
|---|---|
| Stabilizer polymer solution, 52% solids | 500 parts |
| Espesol 260F | 200 parts |
| Mixture B |  |
| Methyl methacrylate | 250 parts |
| Butyl methacrylate | 50 parts |
| Styrene | 146 parts |
| Hydroxypropyl methacrylate | 115 parts |
| Acrylic acid | 13 parts |
| Espesol 260F | 110 parts |
| t-Butyl perbenzoate | 16 parts |
| Mixtue C |  |
| Espesol 260F | 50 parts |
| t-Butyl perbenzoate | 10 parts |
| Mixture D |  |
| Espesol 260F | 290 parts |
| Butyl cellosolve | 100 parts |
| Butanol | 50 parts |

The resulting polymer dispersion had a solids content of 45.3%, an acid number of 19.9 based on solids, and a No. 4 Ford Cup viscosity of 20 seconds at 90° F.

A paint was prepared from the above dispersed polymer composition consisting of:

| Dispersed polymer composition (45.3% Solids) | 250 parts |
|---|---|
| Pigment Dispersion (15.5% pigment, 22.8% binder as in Example 1) | 45 parts |
| Melamine Resin (60% solids) | 88 parts |
| Espesol 260F | 55 parts |
| 2-Ethyl hexyl alcohol | 13 parts |

The paint had a No. 4 Ford Cup viscosity of 17 seconds at 25° C., and a calculated solids of 40.7% (1.56% pigment, 39.14% binder resin). The binder consists of 44% dispersed polymer, 30% melamine resin and 26% soluble thermosetting acrylic resin (stabilizer polymer plug pigment dispersion resin). The pigment consists of 65% aluminum pigment and 35% Quinacridone Magenta Toner. The overall solvent composition was about 62% aliphatic naphthas (Espesol 260F and Soltrol 50), 16% n-Butanol, 5% 2-ethyl hexanol, 10% monobutyl and monoethyl ethers of ethylene glycol, 3% acetate ester of monobutyl ether of ethylene glycol, and 4% aromatic hydrocarbon. A spray-out on a primed steel panel, baked 30 minutes at 250° F. had a 20° gloss of 70 at 1.7 mils thickness.

EXAMPLE 11

An automotive paint prepared in accordance with the invention consists of:

| | |
|---|---|
| Resin solution A (see below) | 226 parts |
| Butylated melamine-formaldehyde resin, as a 65% solution in a mixture of 65 parts butyl acetate and 35 parts butyl alcohol | 148 parts |
| Ethyl acetate | 81 parts |
| Cellosolve acetate | 63 parts |
| Toluene | 23 parts |
| Solvesso 100 (aromatic hydrocarbon, B.P. 160-177° C.) | 12 parts |
| Aluminum pigment, 60% metal in 40% hydrocarbon solvent (Silberline L-582) | 10 parts |
| Aluminum pigment, 65% metal in 35% hydrocarbon solvent (Alcan MD 637) | 2 parts |
| Phthalocyanine Blue Pigment Dispersion (see below) | 42 parts |
| Quinacridone Magenta Pigment Dispersion (see below) | 6 parts |
| Dispersed polymer composition (see below) | 187 parts | and has a non-volatile content of 41.18% (1.38% pigment, 39.80% binder resins) and a viscosity of 22 seconds (Ford #4 Cup) at 25° C. The paint is reduced to a spray viscosity of 15 seconds (Ford #4 Cup) with a mixture of VM&P Naphtha 66%, butyl cellosolve acetate 20% and toluene 14% and applied at 2 mils dry film thickness on sheet steel primed with a commercial electrodeposited primer. The paint film, cured 30 minutes at 250° F., had a gloss of 72° minimum using a 20° glossmeter, a hardness of 10 Knoop units, better overbake intercoat adhesion than competitive commercial NAD type topcoats. In other properties such as cold crack resistance, humidity resistance, reflow, color drift, film build, oven stability and acid spotting resistance, the paint was equal or better than competitive commercial NAD type topcoats.

Resin Solution A is a thermosetting acrylic (TSA) copolymer of 23.57 parts butyl methacrylate, 17.51 parts styrene, 7.5 parts hydroxyethyl methacrylate (94% grade), and 1 part glacial methacrylic acid, prepared in 20.01 parts cellosolve acetate and 30.02 parts n-butyl acetate using 0.39 parts di-tertiary butyl peroxide as catalyst. Total non-volatile content is 49.58% assuming 100 percent conversion of monomers.

Dispersed Polymer Composition (NAD) is a dispersion of a thermosetting acrylic copolymer of 167 parts methyl methacrylate, 103 parts styrene, 69.7 parts hydroxypropyl methacrylate and 3 parts glacial acrylic acid prepared in 303 parts of a 50% solution of a stabilizer polymer prepared from lauryl methacrylate, butyl methacrylate, styrene, hydroxypropyl methacrylate and acrylic acid in the ratios 32/32/15/20/1, respectively, and enough solvent to equal 1000 parts. Total non-volatile of the dispersion was 51% (approximately 16% stabilizer and 35% dispersed polymer). The solvents in the 303 parts of stabilizer polymer solution is a mixture consisting of 55% High Flash VM&P Naphtha, 30% VM&P Naphtha, and 15% butyl cellosolve. Additional solvents added in the preparation of the dispersed polymer consisted of a mixture whose composition was approximately 36% VM&P Naphtha, 46% High Flash VM&P Naphtha and 18% n-butanol.

Phthalocyanine Blue Pigment Dispersion is a dispersion of 7.61% phthalocyanine blue pigment in 33.93% vehicle (approximately 50% solution of a thermosetting copolymer of 48.0% butyl methacrylate, 30.5% styrene, 20% hydroxyethyl methacrylate, 94% grade, and 1.5% glacial methacrylic acid, in a mixture of 90 parts xylol and 10% butyl alcohol) and 58.46% of a hydrocarbon solvent consisting of 30—70 mixture of VM&P Naphtha-Xylol.

Quinacridone Magenta Pigment Dispersion is a dispersion of 8.31% pigment in 30.36% vehicle (same as in the phthalocyanine blue dispersion) and 61.33% of hydrocarbon solvent (same as in the phthalocyanine blue dispersion).

EXAMPLE 12

A low-bake repair paint is prepared by adding 4% by volume of acid catalyst solution (41.65% maleic anhydride, 58.35% butyl alcohol) to the paint of Example 11. The repair paint cures at 180° F. in 20 minutes.

The properties of the baked repair finish are equal or better, in all properties tested, than competitive commercial TSA and NAD type topcoats.

EXAMPLE 13

A stabilizer polymer solution was prepared by adding a solution of monomers and catalyst consisting of

| | |
|---|---|
| 2-Ethyl hexyl methacrylate | 320 parts |
| Butyl methacrylate | 320 parts |
| Styrene | 150 parts |
| Hydroxypropyl methacrylate | 200 parts |
| Acrylic acid | 10 parts |
| High Flash VM&P Naphtha | 50 parts |
| Tert. butyl perbenzoate | 14 parts | to a refluxing (130° - 132° C.) mixture of

| | |
|---|---|
| VM&P Naphtha | 300 parts |
| High Flash VM&P Naphtha | 250 parts |
| Butyl cellosolve | 75 parts |
| Cellosolve acetate | 75 parts | over a period of 3 hours and refluxing was continued for 1 hour. Then a mixture of

| | |
|---|---|
| High Flash VM&P Naphtha | 50 parts |
| Tert. butyl perbenzoate | 7 parts | was added over a period of ¼ hour and refluxing was continued for 3 hours. Finally, the resulting resin solution was reduced to 50% non-volatiles with High Flash VM&P Naphtha. The stabilizer resin solution had a Gardner Holt viscosity of X+ at 49.9% non-volatiles and an acid number of 11.0 based on non-volatiles.

A dispersion resin composition was prepared by adding a solution of monomers and catalyst consisting of

| | |
|---|---|
| Methyl methacrylate | 286 parts |
| Styrene | 176 parts |

-continued

| | |
|---|---|
| 2-Hydroxyethyl acrylate | 97 parts |
| Methacrylic Acid | 6 parts |
| High Flash VM&P Naphtha | 100 parts |
| Tert. butyl perbenzoate | 16 parts | to a refluxing solution consisting of

| | |
|---|---|
| Stabilizer polymer solution (above) | 500 parts |
| High Flash VM&P Naphtha | 160 parts |
| VM&P Naphtha | 40 parts | over a period of three hours and refluxing was continued for ½ hour. Then catalyst solution consisting of

| | |
|---|---|
| VM&P Naphtha | 50 parts |
| Tert. butyl perbenzoate | 8 parts | was added over a period of ¼ hour and refluxing was continued for 2 hours. The resulting dispersion polymer composition, after reduction with

| | |
|---|---|
| VM&P Naphtha | 111 parts |
| n-Butanol | 100 parts | had viscosity of 100 seconds (No. 4 Ford Cup) at 72° F. and 51.1% solids. It had an acid number of 10.9 based on solids. The dispersion was smooth and non-settling overnight, but developed some soft settling in 4 days. Paints made with the dispersion in accordance with the invention were similar to those of the above examples.

EXAMPLE 14

A stabilizer polymer solution was prepared by adding a solution of monomers and catalyst consisting of

| | |
|---|---|
| 2-Ethyl hexyl acrylate | 500 parts |
| Styrene | 120 parts |
| Hydroxy propyl methacrylate | 160 parts |
| Acrylic acid | 10 parts |
| Tert. butyl perbenzoate | 10 parts | to a refluxing (129° C.) mixture of

| | |
|---|---|
| High Flash VM&P Naphtha | 400 parts |
| VM&P Naphtha | 50 parts |
| Heptane | 100 parts | over a period of 2 hours and then the mixture was refluxed for another hour. A solution of catalyst consisting of

| | |
|---|---|
| High Flash VM&P Naphtha | 50 parts |
| Tert. butyl perbenzoate | 5 parts | was then added over ¼ hour and then the mixture was refluxed for 3 hours while additional solvent was added consisting of

| | |
|---|---|
| Butyl cellosolve | 50 parts |
| Toluene | 50 parts |
| High Flash VM&P Naphtha | 50 parts |
| Cellosolve acetate | 50 parts | to obtain a stabilizer polymer solution having a Gardner Holt viscosity of H at 49.5% solids and 25° C., and an acid number of 12.5 based on solids.

A dispersion polymer composition was made in a manner similar to the above examples by copolymerizing a solution of monomers consisting of

| | |
|---|---|
| Methyl methacrylate | 274 parts |
| Styrene | 172 parts |
| Hydroxy propyl methacrylate | 115 parts |
| Acrylic acid | 10 parts |
| High Flash VM&P Naphtha | 150 parts |
| VM&P Naphtha | 50 parts | in the presence of a solution of the above stabilizer polymer consisting of

| | |
|---|---|
| Stabilizer polymer solution (above) | 500 parts |
| High Flash VM&P Naphtha | 150 parts | using 30 parts of tert. butyl perbenzoate catalyst. After further reduction with

| | |
|---|---|
| VM&P Naphtha | 80 parts |
| n-Butanol | 60 parts |
| Butyl cellosolve | 60 parts | the dispersion polymer composition had a solids content of 51.2%, a viscosity of 54 seconds (No. 4 Ford Cup) at 66° F. and an acid number of 15.3 based on solids. The dispersion was smooth and showed only slight, medium soft settling in three days. Paints made with the dispersion were similar to those of the above examples.

What is claimed is

1. The method of preparing a storage stable, pigmented, non-aqueous dispersed polymer coating composition comprising:
    a. preparing a volatile organic solvent solution containing 40 to 60% by weight of a stabilizer copolymer consisting essentially of
        A. 40 to 70% of at least one solubilizing monomer of the group consisting of alkyl and cycloalkyl esters of acrylic and methacrylic acids and alcohols wherein the alkyl or cycloalkyl groups contain 4 or more carbon atoms,
        B. 15 to 20% by weight of a reactive group containing monomer of the group consisting of hydroxyethyl, hydroxypropyl and glycidyl esters of acrylic and methacrylic acids,
        C. 0.5 to 1.5% by weight of an α, β-unsaturated carboxylic acid and
        D. 15 to 20% by weight of styrene or a derivative of styrene and by copolymerizing (A), (B), (C) and (D) in a volatile solvent comprised predominantly of aliphatic hydrocarbons having a boiling point in the range of 130° to 140° C.
    b. forming a composition comprising a dispersion of copolymer in the solution of stabilizer copolymer of (a) by copolymerizing a monomer mixture in said solution, said monomer mixture consisting of
        1. 10 to 30% by weight of a reactive group containing monomer of the group consisting of hydroxyethyl, hydroxypropyl and glycidyl esters of acrylic and methacrylic acids,
        2. 0 to 3% by weight of an α, β-unsaturated carboxylic acid, 3. 30 to 80% by weight of a lower alkyl ester of acrylic or methacrylic acid and
4. 0 to 50% by weight of styrene or a derivative of styrene, and the total solids in said composition consists of 50–90% by weight of dispersed copolymer and 10 to 50% by weight of dissolved polymer and c. mixing the dispersion obtained in (b) with pigment and aminoplast resin to obtain paint composition containing 30 to 50 % solids with a resin to pigment ratio of from about 50 to 1 to about 3.5 to 1.

2. A method as in claim 1 wherein (A) of the stabilizer copolymer consists of:

40 to 70% by weight of at least one solubilizing monomer of the group consisting of acrylic acid and methacrylic acid ester of $C_4$ or higher aliphatic and cyclo aliphatic alcohols, at least 50% which is lauryl methacrylate.

3. A method as in claim 2 wherein (B) of the stabilizers copolymer is hydroxypropyl methacrylate.

4. A method as in claim 1 wherein the aminoplast resin added in step (C) is melamine-formaldehyde resin, and the pigment is added as a dispersion in an organic solvent solution of a thermosetting acrylic copolymer.

5. A method as in claim 4 wherein the resin content of the coating consists of:

i. 10 to 50% by weight of dispersed polymer ii. 30 to 35% melamine-formaldehyde resin and
iii. dissolved thermosetting acrylic resin to total 100%.

6. A method as in claim 5 wherein the dispersed polymer consists of a copolymer of (1) 10 to 30% by weight of a reactive group containing monomer of the group consisting of hydroxyethyl, hydroxypropyl and glycidyl esters of acrylic and methacrylic acids, (2) 0 to 3% of an $\alpha,\beta$-unsaturated carboxylic acid (3) 30 to 80% by weight of a lower alkyl ester of acrylic or methacrylic acid and (4) 0 to 50% by weight of styrene or a derivative of styrene.

7. A method as in claim 6 wherein the reactive group containing monomer of (1) is hydroxypropyl methacrylate.

8. A method as in claim 6 wherein the reactive group containing monomer of (1) is hydroxyethyl acrylate.

9. A method as in claim 6 14 wherein the dissolved thermosetting acrylic resin is a copolymer wherein (A) is at least 50% lauryl methacrylate, (B) is hydroxypropyl methacrylate, (C) is 0.5 to 1.5% by weight of acrylic acid, and (D) is 15 to 20% weight of styrene.

10. A method as in claim 9 wherein the dispersed polymer consists of (1) 10 to 30% hydroxypropyl methacrylate, (2) 0.5 to 2.5% by weight of acrylic acid (3) 40 to 60% by weight of lower alkyl ester of acrylic or methacrylic acid and (4) 0 to 50% styrene.

* * * * *